United States Patent
Inoubli et al.

(10) Patent No.: US 11,384,236 B2
(45) Date of Patent: Jul. 12, 2022

(54) LIQUID (METH)ACRYLIC COMPOSITION COMPRISING A MULTISTAGE POLYMER AND A (METH)ACRYLIC MONOMER, ITS METHOD OF PREPARATION AND ITS USE

(71) Applicant: Arkema France, Colombes (FR)

(72) Inventors: Raber Inoubli, Villeurbanne (FR); Philippe Hajji, Chatillon d'Azergues (FR); Rosangela Pirri, Montardon (FR); Pierre Gerard, Denguin (FR)

(73) Assignee: ARKEMA FRANCE, Colombes (FR)

(*) Notice: Subject to any disclaimer, the term of this patent is extended or adjusted under 35 U.S.C. 154(b) by 0 days.

(21) Appl. No.: 17/078,144

(22) Filed: Oct. 23, 2020

(65) Prior Publication Data

US 2021/0040305 A1  Feb. 11, 2021

Related U.S. Application Data

(62) Division of application No. 16/068,993, filed as application No. PCT/EP2017/050462 on Jan. 11, 2017, now Pat. No. 10,815,370.

(30) Foreign Application Priority Data

Jan. 11, 2016  (FR) ................................ FR16.50195

(51) Int. Cl.
| | | |
|---|---|---|
| *C08L 33/12* | (2006.01) | |
| *C08F 265/08* | (2006.01) | |
| *C08F 220/14* | (2006.01) | |
| *C08L 51/00* | (2006.01) | |
| *C08J 5/24* | (2006.01) | |

(52) U.S. Cl.
CPC ............ *C08L 33/12* (2013.01); *C08F 220/14* (2013.01); *C08F 265/08* (2013.01); *C08J 5/24* (2013.01); *C08L 51/00* (2013.01); *C08J 2333/12* (2013.01)

(58) Field of Classification Search
CPC ......... C08L 33/12; C08L 51/00; C08K 5/101; C08K 7/02
See application file for complete search history.

(56) References Cited

U.S. PATENT DOCUMENTS

| | | | | |
|---|---|---|---|---|
| 3,793,402 A | * | 2/1974 | Owens | .................... C08L 33/20 525/81 |
| 6,319,966 B1 | * | 11/2001 | Kang | .................... C08F 285/00 523/201 |
| 6,331,580 B1 | | 12/2001 | Molnar | |
| 2005/0085607 A1 | | 4/2005 | Kabs et al. | |
| 2011/0034612 A1 | | 2/2011 | Lyons et al. | |
| 2012/0270965 A1 | * | 10/2012 | Kim | ........................ C08L 33/06 523/122 |
| 2013/0281629 A1 | | 10/2013 | Pirri et al. | |
| 2014/0364541 A1 | | 12/2014 | Lyons et al. | |
| 2015/0218362 A1 | | 8/2015 | Gerard et al. | |
| 2015/0218369 A1 | | 8/2015 | Okamoto et al. | |
| 2016/0009878 A1 | | 1/2016 | Gerard | |
| 2016/0017138 A1 | * | 1/2016 | Gerard | ........................ C08J 5/24 525/94 |
| 2016/0279033 A1 | * | 9/2016 | Moser | ...................... C09D 4/00 |

FOREIGN PATENT DOCUMENTS

| | | | | |
|---|---|---|---|---|
| EP | 0 985 692 B1 | 1/2005 | | |
| EP | WO 2014/013028 A1 | 1/2014 | | |
| WO | WO-2014013028 A1 | * | 1/2014 | .......... D06M 13/203 |
| WO | WO-2014135815 A1 | * | 9/2014 | .............. C08L 33/12 |

* cited by examiner

*Primary Examiner* — Robert C Boyle

(74) *Attorney, Agent, or Firm* — Buchanan Ingersoll & Rooney P.C.

(57) ABSTRACT

The present invention relates to a liquid (meth)acrylic composition comprising a (meth)acrylic monomer, a (meth)acrylic polymer and a multistage polymer.

In particular the present invention it relates to liquid composition comprising a (meth)acrylic monomer, a (meth)acrylic polymer and a multistage polymer that can be used as a syrup and especially as a syrup for impregnation.

14 Claims, No Drawings

LIQUID (METH)ACRYLIC COMPOSITION COMPRISING A MULTISTAGE POLYMER AND A (METH)ACRYLIC MONOMER, ITS METHOD OF PREPARATION AND ITS USE

CLAIM TO PRIORITY

This application in a Divisional Application of, and claims benefit to, co-pending application number U.S. Ser. No. 16/068,993, filed Jul. 10, 2018; which claimed benefit, under U.S.C. § 119 or § 365 of PCT Application Number PCT/EP2017/050462, filed Jan. 11, 2017, and French Patent Application Number FR16.50195, filed Jan. 11, 2016. The disclosure of each of these applications incorporated herein by reference in its entirety for all purposes.

FIELD OF THE INVENTION

The present invention relates to a liquid (meth)acrylic composition comprising a (meth)acrylic monomer, a (meth)acrylic polymer and a multistage polymer.

In particular the present invention it relates to liquid composition comprising a (meth)acrylic monomer, a (meth)acrylic polymer and a multistage polymer that can be used as a syrup and especially as a syrup for impregnation.

More particularly the present invention relates also to a process for preparing a liquid composition comprising a (meth)acrylic monomer, a (meth)acrylic polymer and a multistage polymer.

Technical Problem

Impact modifiers are widely used to improve the impact strength for polymeric compositions with the aim to compensate their inherent brittleness or the embrittlement that occurs at ambient temperature but also and especially sub-zero temperatures, notch sensitivity and crack propagation. So, an impact modified polymer is a polymeric material whose impact resistance and toughness have been increased by the incorporation of phase micro domains of a rubbery material.

This is usually done due to the introduction of microscopic rubber particles into the polymer matrix that can absorb the energy of an impact or dissipate it. One possibility is to introduce the rubber particles in form of core-shell particles. These core-shell particles that possess very generally a rubber core and a polymeric shell, having the advantage of a proper particle size of the rubber core for effective toughening and the grafted shell in order to have the adhesion and compatibility with the thermoplastic matrix.

The performance of the impact modification is a function of the particles size, especially of the rubber part of the particle, and its quantity. There is an optimal average particle size in order to have the highest impact strength for a given quantity of added impact modifier particles.

These primary impact modifier particles are usually added in form of powder particles to the polymeric material. These powder particles are agglomerated primary impact modifier particles. During the blending of the thermoplastic material with the powder particles the primary impact modifier particles are regained and are dispersed more or less homogenously dispersed in the thermoplastic material.

While the particle size of the impact modifier particles in the range of nanometers, the size of the agglomerated powder particles is in the range of micrometers. Latter is much easier for handling.

For many polymers, thermoplastic or thermoset polymers it is very difficult or nearly impossible to disperse correctly these multistage polymer in form of core shell particles as agglomerated dry powders. An ideal homogenous dispersion of the core-shell particle has no agglomerates after the dispersion in the thermoplastic material also called matrix.

This is even more difficult if the multistage polymers should be homogenously distributed in a polymeric matrix which comprises also a fibrous substrate as for example fibre reinforced polymeric composites.

The fibrous substrate is usually impregnated by a liquid composition, either a molten polymer or a liquid composition comprising monomers, oligomers and/or polymers.

BACKGROUND OF THE INVENTION

The document WO2014/013028 discloses an impregnation process for a fibrous substrate, a liquid (meth) acrylic syrup for the impregnation process, its method of polymerization and structured article obtained thereof. The syrup comprises a (meth)acrylic monomer, a (meth)acrylic polymer and optionally impact modifier in the form of fine particles.

None of the prior art documents discloses a composition as claimed or a process for obtaining it or its use.

SUMMARY OF THE INVENTION

The objective of the present invention is to obtain liquid composition comprising a (meth)acrylic monomer, a (meth)acrylic polymer and a multistage polymer, with a homogenous dispersion of the multistage polymer.

An objective of the present invention is also to have a liquid composition comprising a (meth)acrylic monomer, a (meth)acrylic polymer and a multistage polymer, with a homogenous dispersion of the multistage polymer, that can be used in a polymerization process.

Another objective of the present invention is to avoid or reduce significantly the agglomeration of multistage polymer.

Still an additional objective is having a process for preparing a liquid composition comprising a (meth)acrylic monomer, a (meth)acrylic polymer and a multistage polymer, with a homogenous dispersion of the multistage polymer.

Still a further objective is the use of the composition comprising a monomer, a (meth)acrylic polymer for the impact modification of polymers.

Still a further objective is to obtain liquid composition comprising a (meth)acrylic monomer, a (meth)acrylic polymer and a multistage polymer, with a homogenous dispersion of the multistage polymer as impregnation liquid for a fibrous substrate or the use the liquid composition in an impregnation process for impregnating a fibrous substrate.

Still another objective of the present invention is to wet completely, correctly and in a homogenous way a fibrous substrate during impregnation with a liquid composition comprising a multistage polymer.

Surprisingly it has been found that a liquid composition comprising
  a) a (meth)acrylic polymer (P1),
  b) a multi stage polymer and
  c) a (meth)acrylic monomer (M1)
wherein the multistage polymer to monomer (M1) ratio by weight in the liquid composition is between 1/99 and 25/75, is less viscous than a composition not comprising the (meth)acrylic polymer (P1).

Surprisingly it has also been found that a liquid composition comprising
  a) a (meth)acrylic polymer (P1),
  b) a multi stage polymer and
  c) a (meth)acrylic monomer (M1)
wherein the multistage polymer to monomer (M1) ratio by weight in the liquid composition is between 1/99 and 25/75, possesses a better dispersion of the multistage polymer than a composition not comprising the (meth)acrylic polymer (P1).

Surprisingly it has also been found that a liquid composition comprising
  a) a (meth)acrylic polymer (P1),
  b) a multi stage polymer and
  c) a (meth)acrylic monomer (M1)
wherein the multistage polymer to monomer (M1) ratio by weight in the liquid composition is between 1/99 and 25/75, can be used to prepare a better dispersion of the multistage polymer in the monomer (M1) than a composition not comprising the (meth)acrylic polymer (P1).

Surprisingly it has also been found that a process for manufacturing a liquid composition comprising the steps of
  a) preparing a composition comprising a the (meth)acrylic polymer (P1) and a multi stage polymer
  b) mixing the composition of previous step with a (meth)acrylic monomer (M1) wherein the multistage polymer to monomer (M1) ratio by weight in the liquid composition is between 1/99 and 25/75, yields to a liquid composition that is less viscous than a composition not comprising the (meth)acrylic polymer (P1).

Surprisingly it has also been found that a process for manufacturing a liquid composition comprising the steps of
  a) preparing a composition comprising a the (meth)acrylic polymer (P1) and a multi stage polymer
  b) mixing the composition of previous step with a (meth)acrylic monomer (M1) wherein the multistage polymer to monomer (M1) ratio by weight in the liquid composition is between 1/99 and 25/75, yields to a impregnation liquid in form of a (meth) acrylic syrup.

Surprisingly it has also been found that a liquid composition comprising
  a) a (meth)acrylic polymer (P1),
  b) a multi stage polymer and
  c) a (meth)acrylic monomer (M1)
wherein the multistage polymer to monomer ratio by weight in the liquid composition is between 1/99 and 25/75, can be used for impregnating a fibrous substrate.

Surprisingly it has also been found that a liquid composition comprising
  a) a (meth)acrylic polymer (P1),
  b) a multi stage polymer and
  c) a (meth)acrylic monomer (M1)
wherein the multistage polymer to monomer ratio by weight in the liquid composition is between 1/99 and 25/75, can be used in impregnation process for impregnating a fibrous substrate, wherein said fibrous substrate is made of long fibres.

DETAILED DESCRIPTION OF THE INVENTION

According to a first aspect, the present invention relates to a liquid composition comprising
  a) a (meth)acrylic polymer (P1),
  b) a multi stage polymer and
  c) a (meth)acrylic monomer (M1)
wherein the multistage polymer to monomer ratio by weight in the liquid composition is between 1/99 and 25/75.

According to a second aspect, the present invention relates to a process for manufacturing a liquid composition comprising the steps of
  a) preparing a composition comprising a the (meth)acrylic polymer (P1) and a multi stage polymer
  b) mixing the composition of previous step with a (meth)acrylic monomer (M1)
wherein the multistage polymer to monomer ratio by weight in the liquid composition is between 1/99 and 25/75.

In a third aspect the present invention relates to the use a liquid composition comprising
  a) a (meth)acrylic polymer (P1),
  b) a multi stage polymer and
  c) a (meth)acrylic monomer (M1)
wherein the multistage polymer to monomer ratio by weight in the liquid composition is between 1/99 and 25/75, for impregnating a fibrous substrate.

In a forth aspect the present invention relates to the use a liquid composition comprising
  a) a (meth)acrylic polymer (P1),
  b) a multi stage polymer and
  c) a (meth)acrylic monomer (M1)
wherein the multistage polymer to monomer ratio by weight in the liquid composition is between 1/99 and 25/75, in an impregnation process for impregnating a fibrous substrate, wherein said fibrous substrate is made of long fibres.

By the term "polymer powder" as used is denoted a polymer comprising powder grain in the range of at least 1 micrometer (µm) obtained by agglomeration of primary polymer comprising particles in the nanometer range.

By the term "primary particle" as used is denoted a spherical polymer comprising particle in the nanometer range. Preferably the primary particle has a weight average particle size between 20 nm and 800 nm.

By the term "particle size" as used is denoted the volume average diameter of a particle considered as spherical.

By the term "copolymer" as used is denoted that the polymer consists of at least two different monomers.

By "multistage polymer" as used is denoted a polymer formed in sequential fashion by a multi-stage polymerization process. One preferred process is a multi-stage emulsion polymerization process in which the first polymer is a first-stage polymer and the second polymer is a second-stage polymer, i.e., the second polymer is formed by emulsion polymerization in the presence of the first emulsion polymer.

By the term "(meth)acrylic" as used is denoted all kind of acrylic and methacrylic monomers.

By the term "(meth)acrylic polymer" as used is denoted that the (meth)acrylic) polymer comprises essentially polymers comprising (meth)acrylic monomers that make up 50 wt % or more of the (meth)acrylic polymer.

By the term "epoxy resin" as used is understood any organic compound having at least two functional groups of oxirane type which can be polymerized by ring opening.

By the term "(meth)acrylic resin" as used is understood adhesives based on acrylic and methacrylic monomers.

By the term "masterbatch" as used is understood composition that comprises an additive in high concentration in a carrier material. The additive is dispersed in the carrier material.

By the term "impact modifier" as used is understood a material that once incorporated in a polymeric material increases the impact resistance and toughness of that polymeric material by phase micro domains of a rubbery material or rubber polymer.

By the term "rubber" as used is denoted to the thermodynamic state of the polymer above its glass transition.

By the term "rubber polymer" as used is denoted a polymer that has a glass transition temperature (Tg) below 0° C.

The dynamic viscosity of the liquid composition according to the invention is in a range from 10 mPa*s to 1 000 000 mPa*s, preferably from 10 mPa*s to 500 000 mPa*s and advantageously from 50 mPa*s to 300 000 mPa*s. The viscosity of the liquid composition (sometimes also called syrup) can be easily measured with a Rheometer with a shear rate between 0.1 s-1 and 100 s-1. The dynamic viscosity is measured at 25° C. If there is a shear thinning the viscosity is measured at a shear rate of is-1.

With regard to the (meth)acrylic polymer (P1), it has a mass average molecular weight Mw of less than 100 000 g/mol, preferably less than 90 000 g/mol, more preferably less than 80 000 g/mol, still more preferably less than 70 000 g/mol, advantageously less than 60 000 g/mol, more advantageously less than 50 000 g/mol and still more advantageously less than 40 000 g/mol.

The (meth)acrylic polymer (P1), it has a mass average molecular weight Mw above 2 000 g/mol, preferably above 3000 g/mol, more preferably above 4000 g/mol, still more preferably above 5 000 g/mol, advantageously above 6 000 g/mol, more advantageously above 6 500 g/mol and still more advantageously above 7 000 g/mol and most advantageously above 10 000 g/mol.

The mass average molecular weight Mw of (meth)acrylic polymer (P1) is between 2 000 g/mol and 100 000 g/mol, preferable between 3 000 g/mol and 90 000 g/mol and more preferably between 4 000 g/mol and 80 000 g/mol advantageously between 5000 g/mol and 70 000 g/mol, more advantageously between 6 000 g/mol and 50 000 g/mol and most advantageously between 10 000 g/mol and 40 000 g/mol.

Preferably the (meth)acrylic polymer (P1) is a copolymer comprising (meth)acrylic monomers. More preferably the (meth)acrylic polymer (P1) is a (meth) acrylic polymer. Still more preferably the (meth)acrylic polymer (P1) comprises at least 50 wt % monomers chosen from C1 to C12 alkyl (meth)acrylates. Advantageously preferably the (meth) acrylic polymer (P1) comprises at least 50 wt % of monomers chosen from C1 to C4 alkyl methacrylate and C1 to C8 alkyl acrylate monomers and mixtures thereof.

Preferably the glass transition temperature Tg of the (meth)acrylic polymer (P1) is between 30° C. and 150° C. The glass transition temperature of the (meth)acrylic polymer (P1) is more preferably between 40° C. and 150° C., advantageously between 45° C. and 150° C. and more advantageously between 50° C. and 150° C.

Preferably the polymer (meth)acrylic polymer (P1) is not crosslinked.

Preferably the polymer (meth)acrylic polymer (P1) is not grafted on any other polymer or polymers.

In a first preferred embodiment the (meth)acrylic polymer (P1) comprises from 50 wt % to 100 wt % methyl methacrylate, preferably from 80 wt % to 100 wt % methyl methacrylate, still more preferably from 80 wt % to 99.8 wt % methyl methacrylate and from 0.2 wt % to 20 wt % of an C1 to C8 alkyl acrylate monomer. Advantageously the C1 to C8 alkyl acrylate monomer is chosen from methyl acrylate, ethyl acrylate or butyl acrylate.

In a second preferred embodiment the (meth)acrylic polymer (P1) comprises between 0 wt % and 50 wt % of a functional monomer. Preferably the (meth)acrylic polymer (P1) comprises between 0 wt % and 30 wt % of the functional monomer, more preferably between 1 wt % and 30 wt %, still more preferably between 2 wt % and 30 wt %, advantageously between 3 wt % and 30 wt %, more advantageously between 5 wt % and 30 wt % and most advantageously between 5 wt % and 30 wt %.

Preferably the functional monomer of the second preferred embodiment is a (meth)acrylic monomer. The functional monomer has the formula (1) or (2):

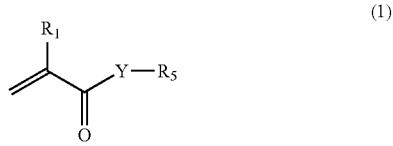

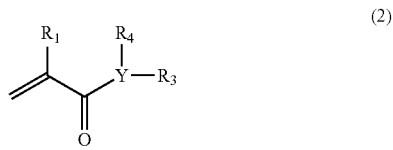

wherein in both formulas (1) and (2) $R_1$ is chosen from H or $CH_3$; and in formula (1) Y is O, $R_5$ is H or an aliphatic or aromatic radical having at least one atom that is not C or H; and in formula (2) Y is N and $R_4$ and/or $R_3$ is H or an aliphatic or aromatic radical.

Preferably the functional monomer (1) or (2) is chosen from glycidyl (meth)acrylate, acrylic or methacrylic acid, the amides derived from these acids, such as, for example, dimethylacrylamide, 2-methoxyethyl acrylate or methacrylate, 2-aminoethyl acrylates or methacrylates are optionally quaternized, acrylate or methacrylate monomers comprising a phosphonate or phosphate group, alkyl imidazolidinone (meth) acrylates, polyethylene glycol (meth) acrylates. Preferably the polyethylene glycol group of polyethylene glycol (meth) acrylates has a molecular weight ranging from 400 g/mol to 10 000 g/mol The multistage polymer according to the invention has at least two stages that are different in its polymer composition.

The multistage polymer is preferably in form of polymer particles considered as spherical particles. These particles are also called core shell particles. The first stage forms the core, the second or all following stages the respective shells.

With regard to the polymeric particle according to the invention, which is the primary particle, it has a weight average particle size between 15 nm and 900 nm. Preferably the weight average particle size of the polymer is between 20 nm and 800 nm, more preferably between, more preferably between 25 nm and 600 nm, still more preferably between 30 nm and 550 nm, again still more preferably between 35 nm and 500 nm, advantageously between 40 nm and 400 nm, even more advantageously between 75 nm and 350 nm and advantageously between 80 nm and 300 nm. The primary polymer particles can be agglomerated giving a polymer powder comprising either the multi stage polymer or the (meth) acrylic polymer (P1) and the multi stage polymer.

The polymer particle is obtained by a multistage process such as a process comprising two, three or more stages.

The polymer particle has a multilayer structure comprising at least one layer (A) comprising a polymer (A1) having a glass transition temperature below 0° C. and another layer (B) comprising a polymer (B1) having a glass transition temperature over 30° C.

In a first preferred embodiment the polymer (B1) having a glass transition temperature of at least 30° C. is the external layer of the polymer particle having the multilayer structure.

In a second preferred embodiment the polymer (B1) having a glass transition temperature of at least 30° C. is an intermediate layer of the polymer particle having the multilayer structure, before the multistage polymer is brought into contact with the monomer (M1).

Preferably the stage (A) is the first stage and the stage (B) comprising polymer (B1) is grafted on stage (A) comprising polymer (A1) or another intermediate layer. By first stage is meant that the stage (A) comprising polymer (A1) is made before the stage (B) comprising polymer (B1).

The polymer (A1) having a glass transition temperature below 0° C. in the layer (A) is never made during the last stage of the multistage process. This means that the polymer (A1) is never in the external layer of the particle with the multilayer structure. The polymer (A1) having a glass transition temperature below 0° C. in the layer (A) is either in the core of the polymer particle or one of the inner layers.

Preferably the polymer (A1) having a glass transition temperature below 0° C. in the layer (A) is made in the first stage of the multistage process forming the core for the polymer particle having the multilayer structure and/or before the polymer (B1) having a glass transition temperature over 60° C. Preferably the polymer (A1) is having a glass transition temperature below −5° C., more preferably below −15° C., advantageously below −25° C.

In a first preferred embodiment the polymer (B1) having a glass transition temperature over 60° C. is made in the last stage of the multistage process forming the external layer of the polymer particle having the multilayer structure.

In a second preferred embodiment the polymer (B1) having a glass transition temperature of at least 30° C. is an intermediate layer of the polymer particle having the multilayer structure, is made in a stage after the stage for forming the polymer (A1) of the multistage process.

There could be additional intermediate layer or layers obtained by an intermediate stage or intermediate stages The glass transition temperature Tg of the respective polymers can be estimated for example by dynamic methods as thermo mechanical analysis.

In order to obtain a sample of the respective polymers (A1) and (B1) they can be prepared alone, and not by a multistage process, for estimating and measuring more easily the glass transition temperature Tg individually of the respective polymers of the respective stages.

With regard to the polymer (A1), in a first embodiment it is a (meth) acrylic polymer comprising at least 50 wt % of monomers from alkyl acrylates.

More preferably the polymer (A1) comprises a comonomer or comonomers which are copolymerizable with alkyl acrylate, as long as polymer (A1) is having a glass transition temperature of less than 0° C.

The comonomer or comonomers in polymer (A1) are preferably chosen from (meth)acrylic monomers and/or vinyl monomers.

The (meth)acrylic comonomer in polymer (A1) comprises monomers chosen from C1 to C12 alkyl (meth)acrylates. Still more preferably (meth)acrylic comonomer in polymer (A1) comprises monomers of C1 to C4 alkyl methacrylate and/or C1 to C8 alkyl acrylate monomers.

Most preferably the acrylic or methacrylic comonomers of the polymer (A1) are chosen from methyl acrylate, propyl acrylate, isopropyl acrylate, butyl acrylate, tert-butyl acrylate, methyl methacrylate, ethyl methacrylate, butyl methacrylate and mixtures therof, as long as polymer (A1) is having a glass transition temperature of less than 0° C.

Preferably the polymer (A1) is crosslinked. This means that a crosslinker is added to the other monomer or monomers. A crosslinker comprises at least two groups that can be polymerized.

In one specific embodiment polymer (A1) is a homopolymer of butyl acrylate.

In another specific embodiment polymer (A1) is a copolymer of butyl acrylate and at least one crosslinker. The crosslinker presents less than 5 wt % of this copolymer.

More preferably the glass transition temperature Tg of the polymer (A1) of the first embodiment is between −100° C. and 0° C., even more preferably between −100° C. and −5° C., advantageously between −90° C. and −15° C. and more advantageously between −90° C. and −25° C.

With regard to the polymer (A1), in a second embodiment the polymer (A1) is a silicone rubber based polymer. The silicone rubber for example is polydimethyl siloxane. More preferably the glass transition temperature Tg of the polymer (A1) of the second embodiment is between −150° C. and 0° C., even more preferably between −145° C. and −5° C., advantageously between −140° C. and −15° C. and more advantageously between −135° C. and −25° C.

With regard to the polymer (A1), in a third embodiment the polymer (A1) having a glass transition temperature below 0° C. comprises at least 50 wt % of polymeric units coming from isoprene or butadiene and the stage (A) is the most inner layer of the polymer particle having the multilayer structure. In other words the stage (A) comprising the polymer (A1) is the core of the polymer particle.

By way of example, the polymer (A1) of the core of the second embodiment, mention may be made of isoprene homopolymers or butadiene homopolymers, isoprene-butadiene copolymers, copolymers of isoprene with at most 98 wt % of a vinyl monomer and copolymers of butadiene with at most 98 wt % of a vinyl monomer. The vinyl monomer may be styrene, an alkylstyrene, acrylonitrile, an alkyl (meth)acrylate, or butadiene or isoprene. In one embodiment the core is a butadiene homopolymer.

More preferably the glass transition temperature Tg of the polymer (A1) of the third embodiment comprising at least 50 wt % of polymeric units coming from isoprene or butadiene is between −100° C. and 0° C., even more preferably between −100° C. and −5° C., advantageously between −90° C. and −15° C. and even more advantageously between −90° C. and −25° C.

With regard to the polymer (B1), mention may be made of homopolymers and copolymers comprising monomers with double bonds and/or vinyl monomers. Preferably the polymer (B1) is a (meth) acrylic polymer.

Preferably the polymer (B1) comprises at least 70 wt % monomers chosen from C1 to C12 alkyl (meth)acrylates. Still more preferably the polymer (B1) comprises at least 80 wt % of monomers C1 to C4 alkyl methacrylate and/or C1 to C8 alkyl acrylate monomers.

The polymer (B1) can be crosslinked.

Most preferably the acrylic or methacrylic monomers of the polymer (B1) are chosen from methyl acrylate, ethyl acrylate, butyl acrylate, methyl methacrylate, ethyl methacrylate, butyl methacrylate and mixtures thereof, as long as polymer (B1) is having a glass transition temperature of at least 30° C.

Advantageously the polymer (B1) comprises at least 50 wt %, more advantageously at least 60 wt % and even more advantageously at least 70 wt % of monomer units coming from methyl methacrylate.

Preferably the glass transition temperature Tg of the polymer (B1) is between 30° C. and 150° C. The glass transition temperature of the polymer (B1) is more preferably between 50° C. and 150° C., still more preferably between 70° C. and 150° C., advantageously between 90° C. and 150° C. and more advantageously between 90° C. and 130° C.

In another embodiment the multi stage polymer as described previously, has an additional stage, which is the (meth)acrylic polymer (P1). The primary polymer particle according to this embodiment of the invention has a multilayer structure comprising at least one stage (A) comprising a polymer (A1) having a glass transition temperature below 0° C., at least one stage (B) comprising a polymer (B1) having a glass transition temperature over 30° C. and at least one stage (P) comprising the (meth)acrylic polymer (P1) having a glass transition temperature between 30° C. and 150° C.

Preferably the (meth)acrylic polymer (P1) is not grafted on any of the polymers (A1) or (B1).

With regard to the process for manufacturing the multistage polymer according to the invention it comprises the steps of
 a) polymerizing by emulsion polymerization of a monomer or monomer mixture ($A_m$) to obtain at least one layer (A) comprising polymer (A1) having a glass transition temperature of less than 0° C.
 b) polymerizing by emulsion polymerization of a monomer or monomer mixture ($B_m$) to obtain layer (B) comprising a polymer (B1) having a glass transition temperature of at least 30° C.
the monomer or monomer mixture ($A_m$) and the monomer or monomer mixture ($B_m$) are chosen from monomers according to the composition for polymer (A1) and polymer (B1) given earlier.

Preferably the step a) is made before step b). More preferably step b) is performed in presence of the polymer (A1) obtained in step a), if there are only two stages.

Advantageously the process for manufacturing the multistage polymer composition according to the invention is a multistep process comprises the steps one after the other of
 a) polymerizing by emulsion polymerization of a monomer or monomer mixture ($A_m$) to obtain one layer (A) comprising polymer (A1) having a glass transition temperature of less than 0° C.
 b) polymerizing by emulsion polymerization of a monomer or monomer mixture ($B_m$) to obtain layer (B) comprising a polymer (B1) having a glass transition temperature of at least 30° C.

The respective monomers or monomer mixtures ($A_m$) and ($B_m$) for forming the layers (A) and (B) respectively comprising the polymers (A1) and (B1) respectively and the characteristics of the respective polymers (A1) and (B1) are the same as defined before.

The process for manufacturing the multistage polymer can comprise additional steps for additional stages between the steps a) and b).

The process for manufacturing the multistage polymer can also comprise additional steps for additional stages before the steps a) and b). A seed could be used for polymerizing by emulsion polymerization the monomer or monomers mixture ($A_m$) to obtain the layer (A) comprising polymer (A1) having a glass transition temperature of less than 0° C. The seed is preferably a thermoplastic polymer having a glass transition temperature of at least 20° C.

The multistage polymer is obtained as an aqueous dispersion of the polymer particles. The solid content of the dispersion is between 10 wt % and 65 wt %.

With regard to the process for manufacturing the (meth) acrylic polymer (P1) according to the invention is comprises the step of polymerizing the respective (meth)acrylic monomers ($P1_m$). The respective (meth)acrylic monomers ($P1_m$) are the same as defined before for the (meth)acrylic polymer (P1) and two preferred embodiments the (meth)acrylic polymer (P1).

The (meth)acrylic homo or copolymer (P1) could be made in batch or semi-continuous process:
 for the batch process, the mixture of monomers is introduced in one shot just before or after introduction of one or part of the initiator system
 for the semi-continuous process, the monomer mixture is added in multiple shots or continuously in parallel to the initiator addition (the initiator is also added in multiple shots or continuously) during a defined period of addition which could be in the range 30 to 500 min.

The process for preparing the polymer composition comprising the (meth) acrylic polymer (P1) and the multi stage polymer has two preferred embodiments.

In a first preferred embodiment of the process, the (meth) acrylic polymer (P1) is polymerized in the presence of the multistage polymer. The (meth) acrylic polymer (P1) is made as an additional stage of the multistage polymer.

In a second preferred embodiment of the process, the (meth) acrylic polymer (P1) is polymerized apart and mixed or blended with the multistage polymer.

With regard to the process according to the first preferred embodiment for preparing the polymer composition comprising the (meth) acrylic polymer (P1) and the multi stage polymer, it comprises the steps of
 a) polymerizing by emulsion polymerization of a monomer or monomer mixture ($A_m$) to obtain one layer in stage (A) comprising polymer (A1) having a glass transition temperature of less than 0° C.
 b) polymerizing by emulsion polymerization of a monomer or monomer mixture ($B_m$) to obtain layer in stage (B) comprising a polymer (B1) having a glass transition temperature of at least 30° C.
 c) polymerizing by emulsion polymerization of a monomer or monomer mixture ($P1_m$) to obtain a layer in this additional stage comprising the (meth) acrylic polymer (P1) having a glass transition temperature of at least 30° C.
characterized that the (meth) acrylic polymer (P1) has a mass average molecular weight Mw of less than 100 000 g/mol.

Preferably the step a) is made before step b).

More preferably step b) is performed in presence of the polymer (A1) obtained in step a).

Advantageously the method for manufacturing the polymer composition comprising the (meth) acrylic polymer (P1) and the multi stage polymer is a multistep process and comprises the steps one after the other of
 a) polymerizing by emulsion polymerization of a monomer or monomer mixture ($A_m$) to obtain one layer in stage (A) comprising polymer (A1) having a glass transition temperature of less than 0° C.
 b) polymerizing by emulsion polymerization of a monomer or monomer mixture ($B_m$) to obtain layer in stage (B) comprising a polymer (B1) having a glass transition temperature of at least 30° C.
 c) polymerizing by emulsion polymerization of a monomer or monomer mixture ($P1_m$) to obtain a layer in this additional stage comprising the (meth) acrylic polymer (P1) having a glass transition temperature of at least 30° C.

characterized that the (meth) acrylic polymer (P1) has a mass average molecular weight Mw of less than 100 000 g/mol.

The respective monomers or monomer mixtures $(A_m)$, $(B_m)$ and $(P1_m)$ for forming the layers (A), (B) and additional stage respectively comprising the polymers (A1), (B1) and (P1) respectively, are the same as defined before. The characteristics of the polymers (A1), (B1) and (P1) respectively, are the same as defined before.

Preferably the method for manufacturing the polymer composition comprising the (meth) acrylic polymer (P1) and the multi stage polymer comprises the additional step d) of recovering of this polymer composition.

By recovering is meant partial or separation between the aqueous and solid phase, latter comprises the polymer composition.

More preferably according to the invention the recovering of the polymer composition is made by coagulation or by spray-drying.

Spray drying is the preferred method for the recovering and/or drying for the manufacturing method for a polymer powder composition if the polymer (A1) having a glass transition temperature below 0° C. comprises at least 50 wt % of polymeric units coming from alkyl acrylate and the stage (A) is the most inner layer of the polymer particle having the multilayer structure.

Coagulation is the preferred method for the recovering and/or drying for the manufacturing method for a polymer powder composition according to the present invention if the polymer (A1) having a glass transition temperature below 10° C. comprises at least 50 wt % of polymeric units coming from isoprene or butadiene and the stage (A) is the most inner layer of the polymer particle having the multilayer structure.

The method for manufacturing the polymer composition according to the invention can comprise optionally the additional step e) of drying of the polymer composition.

Preferably the drying step e) is made if the step d) of recovering of the polymer composition is made by coagulation.

Preferably after the drying step an e) the polymer composition comprises less than 3 wt %, more preferably less than 1.5 wt % advantageously less than 1% of humidity or water.

The humidity of a polymer composition can be measure with a thermo balance.

The drying of the polymer can be made in an oven or vacuum oven with heating of the composition for 48 hours at 50° C.

With regard to the process according to the second preferred embodiment for preparing the polymer composition comprising the (meth) acrylic polymer (P1) and the multi stage polymer, it comprises the steps of
  a) mixing of the (meth) acrylic polymer (P1) and the multi stage polymer
  b) recovering the obtained mixture of previous step in form of a polymer powder wherein the (meth) acrylic polymer (P1) and the multi stage polymer in step a) are in form of a dispersion in aqueous phase.

The quantities of the aqueous dispersion of the (meth) acrylic polymer (P1) and the aqueous dispersion of the multi stage polymer are chosen in a way that the weight ratio of the multi stage polymer based on solid part only in the obtained mixture is at least 5 wt %, preferably at least 10 wt %, more preferably at least 20 wt % and advantageously at least 50 wt %.

The quantities of the aqueous dispersion of the (meth) acrylic polymer (P1) and the aqueous dispersion of the multi stage polymer are chosen in a way that the weight ratio of the multi stage polymer based on solid part only in the obtained mixture is at most 99 wt %, preferably at most 95 wt % and more preferably at most 90 wt %.

The quantities of the aqueous dispersion of the (meth) acrylic polymer (P1) and the aqueous dispersion of the multi stage polymer are chosen in a way that the weight ratio of the multi stage polymer based on solid part only in the obtained mixture is between 5 wt % and 99 wt %, preferably between 10 wt % and 95 wt % and more preferably between 20 wt % and 90 wt %.

The recovering step b) of the process for manufacturing the polymer composition comprising the (meth) acrylic polymer (P1) and the multi stage polymer, is preferably made by coagulation or by spray drying.

The process for manufacturing the polymer composition comprising the (meth) acrylic polymer (P1) and the multi stage polymer can optionally comprise the additional step c) for drying the polymer composition.

By dry is meant that the polymer composition according to the present invention comprises less than 3 wt % humidity and preferably less than 1.5 wt % humidity and more preferably less than 1.2 wt % humidity.

The humidity can be measured by a thermo balance that heats the polymer composition and measures the weight loss.

The process for manufacturing the polymer composition comprising the (meth) acrylic polymer (P1) and the multi stage polymer yields preferably to a polymer powder. The polymer powder of the invention is in form of particles. A polymer powder particle comprises agglomerated primary polymer particles made by multistage process and the (meth) acrylic polymer (P1).

With regard to the polymer powder comprising the (meth) acrylic polymer (P1) and the multi stage polymer according to the two embodiments of the process of preparation, it has a volume median particle size D50 between 1 µm and 500 µm. Preferably the volume median particle size of the polymer powder is between 10 µm and 400 µm, more preferably between 15 µm and 350 µm and advantageously between 20 µm and 300 µm.

The D10 of the particle size distribution in volume is at least 7 µm and preferably 10 µm.

The D90 of the particle size distribution in volume is at most 950 µm and preferably 500 µm, more preferably at most 400 µm.

The weight ratio r of the (meth) acrylic polymer (P1) in relation to the multi stage polymer is at least 5 wt %, more preferably at least 7 wt % and still more preferably at least 10 wt %.

According to the invention the ratio r of the (meth) acrylic polymer (P1) in relation to the multi stage polymer is at most 95 w %.

Preferably the weight ratio of the (meth) acrylic polymer (P1) in relation to the multi stage polymer is between 5 wt % and 95 wt % and preferably between 10 wt % and 90 wt %.

With regard to the (meth)acrylic monomer (M1) it is a liquid monomer at least in the temperature range between 0° C. and 60° C. The (meth)acrylic monomer (M1) comprises one carbon C=C double bond.

The (meth)acrylic monomer (M1) according to the invention is a monomer that is a solvent for the (meth) acrylic polymer (P1). In other word the (meth) acrylic polymer (P1) is soluble in the (meth)acrylic monomer (M1).

Soluble means that in a certain time the (meth) acrylic polymer (P1) in contact the thermodynamically compatible (meth)acrylic monomer (M1) is dissolved and a solution of the (meth) acrylic polymer (P1) in the (meth)acrylic monomer (M1) is obtained.

The solubility of the (meth) acrylic polymer (P1) in the (meth)acrylic monomer (M1) can be simply tested by mixing under agitation at 25° C. the two compounds. For one skilled in the art the solvents including monomers as (meth) acrylic monomer (M1) for a large number of polymers are known. On the other hand solubility parameter values are given for a large number of polymer and solvents, latter including a large number of monomers for example in Polymer Handbook (4$^{th}$ edition) Ed. J. Brandrup, E. H. Immergut and E. A. Grulke; Pub.: John Wiley and Sons Inc. 1999, Chapter "Solubility Parameter Value" by Eric A. Gulke VII/675 to VII/714.

The (meth)acrylic monomer (M1) is preferably chosen from (meth)acrylic monomers and mixtures thereof. If the (meth)acrylic monomer (M1) is a mixture of several monomers, the (meth) acrylic polymer (P1) is soluble in the mixture comprising the (meth)acrylic monomer(s) (M1).

The (meth)acrylic monomer (M1) is more preferably chosen from acrylic acid, methacrylic acid, alkyl acrylic monomers, alkyl methacrylic monomers and mixtures thereof.

Still more preferably the (meth)acrylic monomer (M1) is chosen from acrylic acid, methacrylic acid, alkyl acrylic monomers, alkyl methacrylic monomers and mixtures thereof, the alkyl group having from 1 to 22 carbons, either linear, branched or cyclic; preferably the alkyl group having from 1 to 12 carbons, either linear, branched or cyclic.

Advantageously the (meth)acrylic monomer (M1) is chosen from methyl methacrylate, ethyl methacrylate, methyl acrylate, ethyl acrylate, methacrylic acid, acrylic acid, n-butyl acrylate, iso-butyl acrylate, n-butyl methacrylate, iso-butyl methacrylate, cyclohexyl acrylate, cyclohexyl methacrylate, isobornyl acrylate, isobornyl methacrylate and mixtures thereof.

More advantageously the (meth)acrylic monomer (M1) is chosen from methyl methacrylate, isobornyl acrylate or acrylic acid and mixtures thereof.

In a first most advantageously embodiment at least 50 wt %, preferably at least 60 wt % of the (meth)acrylic monomer (M1) is methyl methacrylate.

In a second most advantageously at least 50 wt %, preferably at least 60 wt %, more preferably at least 70 wt % and advantageously at least 80 wt % and even more advantageously 90 wt % of the (meth)acrylic monomer (M1) is a mixture of methyl methacrylate with isobornyl acrylate and/or acrylic acid The liquid composition of the present invention that is less viscous than a composition not comprising the (meth) acrylic polymer (P1).

The liquid composition of the present invention can be used to prepare a better dispersed multistage polymer instaed of a composition not comprising the (meth)acrylic polymer (P1).

With regard to the process for manufacturing the liquid composition is comprises the steps of
   a) preparing a composition comprising a (meth) acrylic polymer (P1) and a multi stage polymer b) mixing the composition of previous step with a (meth) acrylic monomer (M1)

wherein the multistage polymer to (meth)acrylic monomer (M1) ratio by weight in the liquid composition is between 1/99 and 25/75.

Preferably the (meth) acrylic polymer (P1) has a mass average molecular weight Mw of less than 100 000 g/mol. The (meth) acrylic polymer (P1) is the same as defined before.

The composition comprising the (meth) acrylic polymer (P1) and a multi stage polymer can be in form of the polymer powder as obtained by the two preferred embodiments of preparation.

The process yields to a liquid composition that is less viscous than a composition not comprising the (meth)acrylic polymer (P1).

The process yields to a liquid composition that possesses a better dispersion of the multistage polymer than a composition not comprising the (meth)acrylic polymer (P1).

The agglomerated polymer powder is better dispersed in the solvent when the (meth)acrylic polymer (P1) is present.

The process of the invention for manufacturing the liquid composition can be used to prepare a better dispersed multistage polymer than a composition not comprising the (meth)acrylic polymer (P1).

An additional aspect of the invention is that the liquid composition comprising a) a (meth)acrylic polymer (P1),
   b) a multi stage polymer and
   c) (meth)acrylic monomer (M1)

wherein the multistage polymer to monomer (M1) ratio by weight in the liquid composition is between 1/99 and 25/75, can be used to prepare a better dispersion of the multistage polymer in the monomer (M1) than a composition not comprising the (meth)acrylic polymer (P1).

Another additional aspect of the invention is that the liquid composition comprising
   a) a (meth)acrylic polymer (P1),
   b) a multi stage polymer and
   c) (meth)acrylic monomer (M1)

wherein the multistage polymer to monomer ratio by weight in the liquid composition is between 1/99 and 25/75, can be used for the preparation of the impact modified polymers, by polymerizing the (meth)acrylic monomer (M1).

The liquid composition according to the invention can also be mixed with other monomers and polymers that are not part of the liquid composition before polymerization. The liquid composition according to the invention can be used as a liquid masterbatch.

The multistage polymer is better distributed in the polymer matrix after polymerization instead than using a composition not comprising the (meth)acrylic polymer (P1).

Another additional aspect of the invention is that the liquid composition comprising
   a) a (meth)acrylic polymer (P1),
   b) a multi stage polymer and
   c) (meth)acrylic monomer (M1)

wherein the multistage polymer to monomer ratio by weight in the liquid composition is between 1/99 and 25/75, can be used as an impregnation liquid (meth) acrylic syrup, preferably for a fibrous substrate.

Another additional aspect of the invention is process for manufacturing a liquid composition comprising the steps of
   a) preparing a composition comprising a the (meth) acrylic polymer (P1) and a multi stage polymer
   b) mixing the composition of previous step with a (meth) acrylic monomer (M1)

wherein the multistage polymer to monomer (M1) ratio by weight in the liquid composition is between 1/99 and 25/75, for an impregnation liquid in form of a (meth) acrylic syrup, preferably an impregnation liquid for a fibrous substrate.

Another additional aspect of the invention relates to an impregnation process for impregnating a fibrous substrate, wherein said fibrous substrate comprises long fibres and said process comprises a step of impregnating said fibrous substrate with a liquid composition comprising:
a) a (meth)acrylic polymer (P1),
b) a multistage polymer and
c) a (meth)acrylic monomer (M1)
wherein the multistage polymer to monomer ratio by weight in the liquid composition is between 1/99 and 25/75.

Another additional aspect of the invention relates to the use of a liquid composition comprising
a) a (meth)acrylic polymer (P1),
b) a multi stage polymer and
c) a (meth)acrylic monomer (M1)
wherein the multistage polymer to monomer ratio by weight in the liquid composition is between 1/99 and 25/75, in an impregnation process for impregnating a fibrous substrate.

Preferably said fibrous substrate comprises long fibres.

The liquid composition according to the invention can be used as a liquid masterbatch for the use as an impregnation liquid (meth) acrylic syrup or in an impregnation process for impregnating a fibrous substrate. The liquid composition is diluted with another monomer.

With regard to the fibrous substrate, one can mention fabrics, felts or nonwovens that may be in the form of strips, laps, braids, locks or pieces. The fibrous material can have different forms and dimensions either one dimensional, two dimensional or three dimensional. A fibrous substrate comprises an assembly of one or more fibres. When the fibres are continuous, their assembly forms fabrics.

The one dimensional form is linear long fibres. The fibers may be discontinuous or continuous. The fibers may be arranged randomly or as a continuous filament parallel to each other. A fiber is defined by its aspect ratio, which is the ratio between length and diameter of the fiber. The fibers used in the present invention are long fibers or continuous fibers. The fibers have an aspect ratio of at least 1000, preferably at least 1500, more preferably at least 2000, advantageously at least 3000 and most advantageously at least 5000.

The two dimensional form are fibrous mats or non woven reinforcements or woven roving or bundles of fibers, which can also be braided.

The three dimensional form are for example stacked or folded fibrous mats or non woven reinforcements or bundles of fibers or mixtures thereof, an assembly of the two dimensional form in the third dimension.

The origins of the fibrous material can be a natural or a synthetic one. As natural material one can mention vegetable fibers, wood fibers, animal fibers or mineral fibers.

Natural fibers are for example sisal, jute, hemp, flax, cotton, coconut fibers, and banana fibers. Animal fibers are for example wool or hair.

As synthetic material one can mention polymeric fibers chosen from fibers of thermosetting polymers, from thermoplastic polymers or their mixtures.

The polymeric fibers can be made of polyamide (aliphatic or aromatic), polyester, polyvinylacohol, polyolefins, polyurethanes, polyvinylchloride, polyethylene, unsaturated polyesters, epoxy resins and vinylesters.

The mineral fibers can also be chosen from glass fibers especially of type E, R or S2, carbon fibers, boron fibers or silica fibers.

The fibrous substrate of the present invention is chosen from vegetable fibers, wood fibers, animal fibers, mineral fibers, synthetic polymeric fibers, glass fibers, carbon fibers or mixtures thereof.

Preferably the fibrous substrate is chosen from mineral fibers.

[Methods of Evaluation]

Viscosity Measurements

The viscosity is measured with a MCR 301 rheometer from Anton Paar. Couette geometry is used. Temperature is 25° C. and with a shear rate from 0.1 s-1 to 100 s-1.

Glass Transition Temperature

The glass transitions (Tg) of the polymers are measured with equipment able to realize a thermo mechanical analysis. A RDAII "RHEOMETRICS DYNAMIC ANALYSER" proposed by the Rheometrics Company has been used. The thermo mechanical analysis measures precisely the viscoelastics changes of a sample in function of the temperature, the strain or the deformation applied. The apparatus records continuously, the sample deformation, keeping the stain fixed, during a controlled program of temperature variation. The results are obtained by drawing, in function of the temperature, the elastic modulus (G'), the loss modulus and the tan delta. The Tg is higher temperature value read in the tan delta curve, when the derived of tan delta is equal to zero.

Molecular Weight

The mass average molecular weight (Mw) of the polymers is measured with by size exclusion chromatography (SEC).

Particle Size Analysis

The particle size of the primary particles after the multistage polymerization is measured with a Zetasizer.

The particle size of the polymer powder after recovering is measured with Malvern Mastersizer 3000 from MALVERN.

For the estimation of weight average powder particle size, particle size distribution and ratio of fine particles a Malvern Mastersizer 3000 apparatus with a 300 mm lenses, measuring a range from 0.5-880 µm is used.

EXAMPLES

Synthesis of multistage polymer (core-shell particles) is made according to the example of sample 1 of WO2012/038441 in order to obtain a multistage polymer. The multistage polymer CS1 is obtained. It comprises a stage (A) comprising a polymer (A1) having a glass transition temperature of less than 0° (essentially made of butyl acrylate) and a stage (B) comprising a polymer (B1) having a glass transition temperature of at least 30° C. (essentially made of methyl methacrylate). The multistage polymer CS1 is kept as an aqueous dispersion for further use.

Synthesis of a (meth)arylic polymer type (P1) is made according to two embodiments: first the (meth) acrylic polymer (P1) is polymerized in the presence of the multistage polymer CS1. The (meth) acrylic polymer (P1) is made as an additional stage of the multistage polymer CS. And in a second embodiment the (meth) acrylic polymer (P1) is polymerized apart and mixed or blended with the multistage polymer after the end of polymerization of the (meth) acrylic polymer (P1).

Comparative Example 1

The multistage polymer CS1 is mixed with methyl methacrylate (MMA) at 20° C. under agitation so that 15 wt % of CS1 are in the liquid composition relatively to the MMA.

Example 1

The (meth) acrylic polymer (P1) is made as an additional stage on the multistage polymer CS1. The mass average molecular weight of the (meth)arylic polymer P1 is $M_w$=28 000 g/mol.

The final polymer composition was then recovered, the polymer composition being dried by spray drying. The obtained polymer composition is mixed with methyl methacrylate (MMA) at 20° C. under agitation so that 15 wt % of CS1 relatively to MMA are in the liquid composition comprising MMA, (meth)arylic polymer (P1) and multistage polymer CS1.

Example 2 the (meth) acrylic polymer (P1) is polymerized apart and mixed or blended with the multistage polymer CS1. Synthesis of the (meth) acrylic polymer (P1): semi continuous process: charged into a reactor, with stirring, were 1700 g of de-ionized water, 0.01 g of FeSO4 and 0.032 g of ethylene-diaminetetraacetic acid, sodium salt (dissolved in 10 g of de-ionized water), 3.15 g of sodium formaldehydesulfoxylate dissolved if 110 g of de-ionized water and 21.33 g of emulsifier potassium salt of beef tallow fatty acid (dissolved in 139.44 g of water), and the mixture was stirred until complete dissolution. Three vacuum-nitrogen purges were carried out in succession and the reactor left under a slight vacuum. The reactor was then heated. At the same time, a mixture comprising 960.03 g of methyl methacrylate, 106.67 g of dimethylacrylamide and 10.67 g of n-octyl mercaptan was nitrogen-degassed for 30 minutes. The reactor is heated at 63° C. and maintained at that temperature. Next, the monomers mixture was introduced into the reactor in 180 min using a pump. In parallel, a solution of 5.33 g of ter-butyl hydroperoxide (dissolved in 100 g of de-ionized water) is introduced (same addition time). The lines was rinsed with 50 g and 20 g of water. Then the reaction mixture was heated at a temperature of 80° C. and the polymerization was then left to completion for 60 minutes after the end of the monomers addition. The reactor was cooled down to 30° C. The obtained solid content is 34.2%. The mass average molecular weight of the (meth)arylic polymer P1 is $M_w$=28 000 g/mol.

The aqueous dispersion of the multistage polymer CS1 and the (meth) acrylic polymer (P1) are mixed in quantities that the weight ratio based on solid polymer between the (meth) acrylic polymer (P1) and the multistage polymer CS1 is 15/85. The mixture was recuperated as a power by spray drying.

The obtained mixture of is mixed with methyl methacrylate at 20° C. under agitation so that 15 wt % of CS1 relatively to MMA are in the liquid composition comprising MMA, (meth)arylic polymer (P1) and multistage polymer CS1.

Example 3 example 2 is repeated but the weight ratio based on solid polymer between the (meth) acrylic polymer (P1) and the multistage polymer CS1 is 25/75.

The viscosity of the respective liquid compositions is measured.

TABLE 1 viscosity results

| Example | Sample | Viscosity [Pa * s] at 0.1 s$^{-1}$ | Solid content of polymers (CS1 + P1) in composition [wt %] | Solid content CS1 in composition [wt %] |
|---|---|---|---|---|
| Comparative example 1 | Liquid composition of MMA with 15% CS1 | 1160 | 15 | 15 |
| Example 1 | Liquid composition of MMA with CS1 and additional shell polymer | 289 | 16.87 | 15 |
| Example 2 | Liquid composition of MMA with blend of P1 and CS1 15/85 wt ratio | 123 | 17.64 | 15 |
| Example 3 | Liquid composition of MMA with blend of P1 and CS1 at 25/75 wt ratio | 87 | 20 | 15 |

As shown in table 1 the global solid content of polymer increases while the ratio of the core-shell polymer stays constant at 15 wt % relatively to the monomer, but the dynamic viscosity of the composition decreases.

The core shell particles are more efficiently dispersed having a lower effective volume in the liquid composition, when the methacrylic polymer is present.

What is claimed is:

1. An impregnation process for impregnating a fibrous substrate, wherein said fibrous substrate comprises fibres having an aspect ratio of at least 1000 and said process comprises a step of impregnating said fibrous substrate with a liquid composition comprising:
    a) a (meth)acrylic polymer (P1), having a mass average molecular weight Mw of less than 100,000 g/mol,
    b) a multistage polymer in the form of core shell particles having a multilayer structure comprising at least one layer (A) comprising a polymer (A1) having a glass transition temperature below 0° C. and another layer (B) comprising a polymer (B1) having a glass transition temperature over 30° C., said layer (A) is made in the first stage of a multistage process forming the core for the polymer particle having the multilayer structure and
    c) a (meth)acrylic monomer (M1) wherein the multistage polymer to monomer ratio by weight in the liquid composition is between 1/99 and 25/75.

2. The impregnation process according to claim 1, wherein the (meth)acrylic polymer (P1) has a mass average molecular weight Mw between 5,000 g/mol and 70,000 g/mol.

3. The impregnation process according to claim 1, wherein the (meth)acrylic polymer (P1) has a mass average molecular weight Mw between 6,000 g/mol and 50,000 g/mol.

4. The impregnation process according to claim 1, wherein said multistage polymer is in form of core shell particles having a multilayer structure comprising at least one layer (A) comprising a polymer (A1) having a glass transition temperature below −5° C. and another layer (B) comprising a polymer (B1) having a glass transition temperature over 60° C., said layer (A) is made in the first stage of a multistage process forming the core for the polymer particle having the multilayer structure.

5. The impregnation process according to claim 1, wherein the multistage polymer to monomer ratio by weight in the liquid composition is between 2/98 and 24/76.

6. The impregnation process according to claim 1, wherein the (meth) acrylic polymer (P1) is soluble in the (meth)acrylic monomer (M1).

7. The impregnation process according to claim 1, wherein the monomer (M1) is from the group consisting of acrylic acid, methacrylic acid, alkyl acrylic monomers, and alkyl methacrylic monomers and mixtures thereof, wherein the alkyl group has from 1 to 22 carbons that are either linear, branched or cyclic.

8. The impregnation process according to claim 1, wherein the monomer (M1) is selected from the group consisting of methyl methacrylate, ethyl methacrylate, methyl acrylate, ethyl acrylate, methacrylic acid, acrylic acid, n-butyl acrylate, iso-butyl acrylate, n-butyl methacrylate, iso-butyl methacrylate, cyclohexyl acrylate, cyclohexyl methacrylate, isobornyl acrylate, isobornyl methacrylate and mixtures thereof.

9. The impregnation process according to claim 1, wherein the layer (A) is the first layer and that layer (B) comprising polymer (B1) is grafted on layer (A) comprising polymer (A1).

10. The impregnation process according to claim 1, wherein the polymers (A1) and (B1) are acrylic or methacrylic polymers.

11. The impregnation process according to claim 1, wherein the polymer (A1) comprises at least 50 weight percent of polymeric units coming from isoprene or butadiene.

12. The impregnation process according to claim 1, wherein the (meth) acrylic polymer (P1) comprises from 50wt % to 100wt % methyl methacrylate.

13. The impregnation process according to claim 1, wherein the (meth) acrylic polymer (P1) comprises between 0wt % and 50wt % of a functional monomer.

14. The impregnation process according to claim 13, wherein the functional monomer is selected from the group consisting of glycidyl (meth)acrylate, acrylic or methacrylic acid, amides derived from acrylic or methacrylic acids, dimethylacrylamide, 2-methoxyethyl acrylate or methacrylate, 2-aminoethyl acrylates or methacrylates that are optionally quaternized, acrylate or methacrylate monomers comprising a phosphonate or phosphate group, alkyl imidazolidinone (meth) acrylates, polyethylene glycol (meth) acrylates.

\* \* \* \* \*